United States Patent [19]

Lambert

[11] 4,063,655

[45] Dec. 20, 1977

[54] UNLOADING APPARATUS HAVING RETRACTABLE CAM WHEEL FOLLOWERS

[75] Inventor: Gerald G. Lambert, Brookfield, Wis.

[73] Assignee: Rexnord Inc., Milwaukee, Wis.

[21] Appl. No.: 699,567

[22] Filed: June 24, 1976

[51] Int. Cl.² ............................................. B65G 67/24
[52] U.S. Cl. ................................................. 214/62 A
[58] Field of Search .................. 214/61, 60, 62 A, 58, 214/62 R; 198/365; 105/241, 377

[56] References Cited

U.S. PATENT DOCUMENTS

| | | | |
|---|---|---|---|
| 2,370,998 | 3/1945 | Schroeder | 105/241 C |
| 2,388,188 | 10/1945 | Schroeder | 105/241 C |
| 3,863,781 | 2/1975 | Butzow | 214/62 A |

*Primary Examiner*—Albert J. Makay
*Assistant Examiner*—Lawrence E. Williams

[57] ABSTRACT

An improved apparatus having a carriage and container which is pivotably connected to the carriage. The container has a cam wheel follower which contacts a cam rail positioned along the path over which the apparatus moves thereby causing the container to pivot. The cam wheel follower is selectively retractable into a housing beneath the container.

3 Claims, 7 Drawing Figures

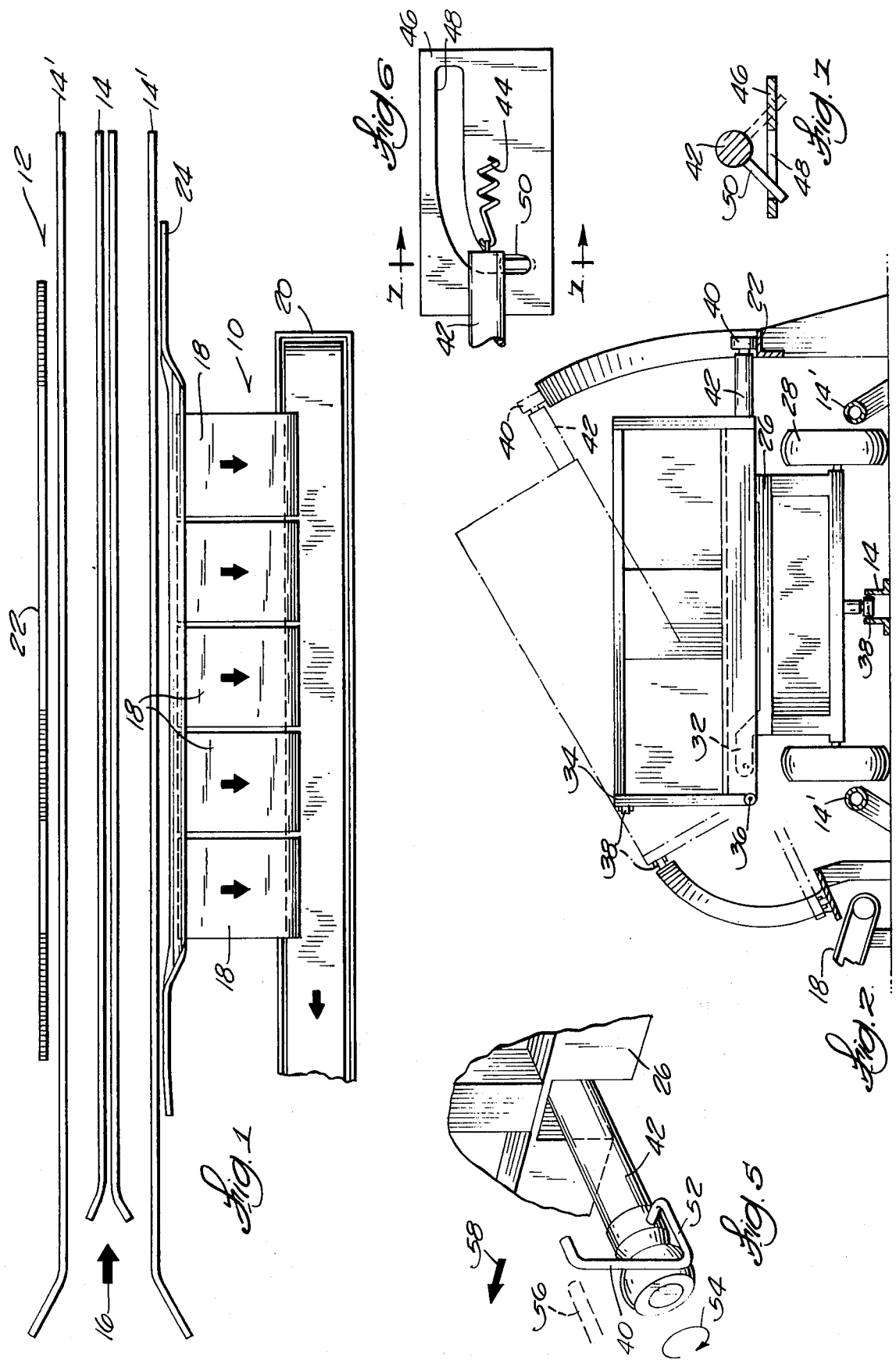

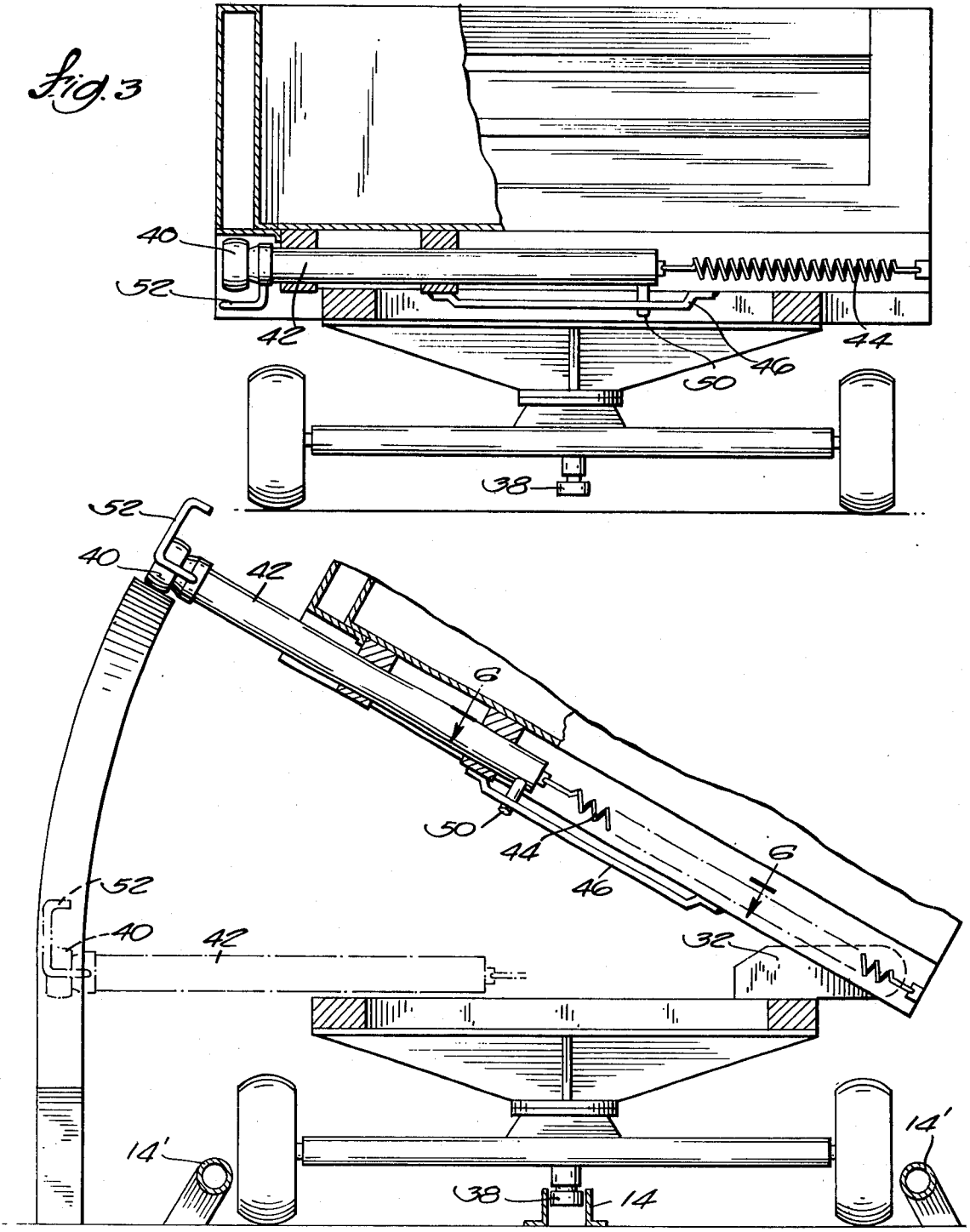

UNLOADING APPARATUS HAVING RETRACTABLE CAM WHEEL FOLLOWERS

BACKGROUND OF THE INVENTION

1. Field of the Invention

This invention relates generally to an apparatus for carrying and unloading articles and, more particularly, to an apparatus suitable for unloading articles from pivotable containers while the containers are being conveyed through an unloading station.

2. Description of the Prior Art

Because of the growing amount of baggage, parcels and mail being transported by aircraft, the major airports are finding it increasingly difficult to efficiently and expeditiously unload and distribute the contents of containers used to carry articles off-loaded from aircraft. A variety of systems and aparatus have been developed to aleviate the growing problem. One such system and apparatus is described and claimed in commonly assigned and concurrently filed application Ser. No. 699,568. The apparatus disclosed therein generally comprises a carriage mounted upon wheels to which a pivotable container is attached. The container also includes a door which is pivotably mounted at its lower end to the container. A cam wheel is mounted on the opposite side of the container from the door and extends outwardly from the body of the apparatus.

The above apparatus is a part of a system which additionally comprises a guide path, including a guide track, and an unloading station. The apparatus itself has a guide track follower which cooperates with the guide track as it approaches the unloading station. Mounted on either side of the guide path are elevated first and second cam rails which are adapted to contact the aforementioned cam wheel and a second cam wheel mounted on the door. The first rail causes the container to pivot about its axis and the second rail restrains the door from opening too quickly. As the apparatus approaches the unloading station the door opens completely due to decreasing height of the second rail and the apparatus is pivoted to its maximum angle. The articles within the container then slide out over the opened door and onto a conveying means at the unloading station.

Because the apparatus described above is generally employed in the vicinity of expensive aircraft and where numerous personnel are working, it is necessary that the apparatus should conform to all safety precautions. One of the features of the above apparatus which has been identified as being possibly prone to cause problems when passing through areas crowded with personnel was the extended cam wheel responsible for pivoting the container about its axis. It is therefore the paramount object of the present invention to provide for an apparatus having a means for resolving the problem yet accomplishing the result intended.

SUMMARY OF THE INVENTION

The improved apparatus in accordance with the preferred embodiment of the present invention includes a carriage adapted or movement between loading and unloading stations, a container pivotably connected to the carriage and adapted for carrying objects between the stations, and an cam follower means associated with the container for contacting a cam surface and pivoting the container to a predetermined angle when actuated. It is at this point when the objects being carried by the container slide out of the container onto the loading station. The improvement comprises a means for permitting relative movement of the cam follower means between an inoperative position in which the follower means is retracted within the structure of the apparatus and an operative position in which the follower means extends outward from the structure of the apparatus and is adapted to contact the cam surface.

Another positive aspect of the present invention is a means by which the cam follower means may be retracted automatically within the structure of the apparatus as the apparatus moves away from the unloading station. Other advantages and positive aspects of the present invention will be appreciated once having read the detailed description and the appended drawings.

BRIEF DESCRIPTION OF THE DRAWINGS

FIG. 1 is a plan view of an unloading station employing the present invention.

FIG. 2 is a rear view of an apparatus which employs the present invention showing the ability of the container to pivot about its axis as it approaches the unloading station.

FIG. 3 is a front view, partially cut away, to show the cam follower in its retracted position.

FIG. 4 is a view similar to that of FIG. 3 except that it shows the cam follower in its extended position and the carriage as pivoted.

FIG. 5 depicts a cut-away perspective of the cam follower in it extended position along with a means for extending and rotating the cam follower.

FIG. 6 is a view taken along lines 6—6 in FIG. 4.

FIG. 7 is a view taken along lines 7—7 of FIG. 6.

DETAILED DESCRIPTION OF THE PREFERRED EMBODIMENT

Referring now to FIG. 1, an unloading station 10 is positioned adjacent to a guide path 12 which provides a path along which apparatus of the present invention move. A guide track 14 extends down guide path 12 and provides a convenient constraining means for preventing undue lateral motions of the apparatus as it moves along guide path 12. The direction of motion of the apparatus is depicted by arrow 16.

Unloading station 10 comprises generally a plurality of conveyors 18 and a single conveyor 20. Conveyors 18 may be of the wide belt type to provide a maximum surface area for carrying away articles unloaded from the apparatus. Conveyor 20 conveys all articles unloaded onto conveyor 18 away from the point of unloading to another position for processing or dispersing the unloaded articles.

Adjacent to and essentially parallel to guide path 12 are two elevated cam rails 22 and 24. As will be discussed hereinafter, cam rail 22 serves to pivot the container of the apparatus about its axis and cam rail 24 provides a means for preventing the rapid opening of the door to the container, and supports the door in the open position while the door acts as a slide.

FIG. 2 depicts a frontal view of an apparatus employing the present invention. The apparatus generally comprises a carriage 26 appropriately mounted on wheels 28, a container 30 mounted above and pivotably attached to carriage 26 by hinge 32, and a door 34 pivotably attached to container 30 along an axis 36.

Mounted to the bottom of carriage 26 is a guide track follower 38 which cooperates with guide track 14 to prevent undue lateral motion of the apparatus as it journeys along guide path 12. Follower 38 enters into the guide track 14 at the diverging portions of the track as seen in FIG. 1. Additionally, guide rails 14 also serve to prevent motion laterally of the apparatus.

Secured to the upper outer surface of door 34 are a plurality of spaced cam followers 38 which contact cam rail 24 once the door has been unlatched from container 30. Although not a part of the present invention and described in detail in copending application Ser. No. 699,568, door 34 automatically unlatches as it approaches the unloading station 10. To prevent door 34 from opening too rapidly, rail 24 is elevated at the point the door is unlatched. Cam followers 38 contact rail 24 at this point and as the apparatus progresses towards the unloading station rail 24 diminishes in height allowing door 34 to be fully opened as it is adjacent conveyors 18.

Cam follower 40 is attached to a arm member 42 on the side opposite to that of door 34. As can be seen from FIG. 2, cam follower 40 is adapted to contact rail 22 such that as rail 22 increases in height, container 30 is pivoted about hinge 32 to the position noted in dashed lines. Although cam follower 40 may be of any type desired depending in part upon the structure of cam rail 22, it is generally desirable to use a cam roller which rolls along the surface of rail 22.

FIGS. 3 and 4 illustrate the cam follower 40 in both its retracted and extended positions in accordance with the present invention. The arm member 42 is appropriately housed beneath and attached to container 30. One end of spring 44 is attached to arm member 42 and the other end is secured to the far wall of container 30. Mounted beneath member 42 is a plate 46 defining a groove 48 which may best be seen in FIG. 6. A finger 50 integrally attached to arm member 42 extends through groove 48.

A handle 52 extends outward from the collar attaching member 42 to cam follower 40. As will be described hereinafter, handle 52 serves to manually extend arm member 42 and rotate it when appropriate. As noted, in FIG. 3 handle 52 along with cam follower 40 are completely housed within the structure of the apparatus when member 42 is in its retracted position.

In operation, as the vehicle pulling the apparatus approaches guide path 12, the operator manually slides arm member 42 through its housing by pulling on handle 52. When fully extracted handle 52 is rotated counter clockwise to place it in position as seen in both FIGS. 4 and 5. The linear portion of groove 48 permits the sliding movement of arm member 42 against the resilient biasing of spring 44. Once member 42 has been fully retracted from its position beneath carriage 26, the operator then rotates the handle to place in a position as seen in FIGS. 4 and 5. The curved portion of groove 48 permits the rotation of finger 50. The curved portion of groove 48 is further notched to prevent return of member 42 ot its retracted position under the biasing of spring 44. The rotation of member 42 can been seen also in FIG. 7. Cam follower now being fully extended can contact rail 22 for pivoting of container 26.

Once container 26 has been fully unloaded and returned to its horizontal position, the retraction of arm member 42 and cam follower 40 can easily be effectuated by either manually turning handle 52 in the clockwise direction indicated by arrow 54 of FIG. 5 or, alternatively, through contact of handle 52 with a stationary object 56 positioned adjacent the guide path as the apparatus moves in the direction indicated by arrow 58. In both instances, turning of the handle 52 in a clockwise direction causes finger 50 to move into the linear portion of groove 48 thereby allowing spring 44 to retract arm member 42 and cam follower 40 beneath the apparatus.

What is claimed is:

1. An improved apparatus for carrying and unloading articles including a carriage adapted for movement between loading and unloading stations, a container pivotably connected to said carriage and adapted for carrying objects between stations, and cam follower means associated with said container for contacting a cam surface and pivoting said container to a predetermind angle when actuated, said improvement comprising a cam follower shaft member mounting said cam follower means and movably attached to said carriage for telescopic movement between a retracted position and an extended position, said cam following means being housed within said apparatus when in the retracted position, biasing means for yieldably biasing said cam follower shaft toward said retracted position, and locking means operative when said member is extended for restraining said shaft in the extended position, said cam shaft member having an arm means extending from a point adjacent said cam follower means when said member is in the extended position for contacting a stationary object to inactivate said locking means and permitting said biasing means to retract said member into its retracted position.

2. The apparatus of claim 1 in which said member is capable of rotation between first and second rotative positions, said locking means permitting rotation of said member only when it is in the extended position, said member having a means cooperating with said locking means when said member is rotated into the second rotative position for preventing movement of said member back into the first rotative position.

3. The apparatus of claim 2 in which said locking means includes a plate defining a groove, said cooperating means being a finger attached to said member and extending into said groove, said groove having a configuration permitting linear movement of said member between the retracted and extended positions and rotation of the member when extended between the first and second rotative positions whereby the finger and groove cooperate to prevent the member from rotating back into the first position and linear movement into the retracted position.

* * * * *